United States Patent
Hu et al.

(10) Patent No.: US 10,285,244 B2
(45) Date of Patent: May 7, 2019

(54) ILLUMINATING DEVICE, CONTROL METHOD THEREOF AND CONTROL SYSTEM THEREOF

(71) Applicant: OPPLE LIGHTING CO., LTD., Shanghai (CN)

(72) Inventors: Yang Hu, Shanghai (CN); Zhixian Zhou, Shanghai (CN); Liang Wang, Shanghai (CN); Jian Wang, Shanghai (CN); Jie He, Shanghai (CN); Wei Wen, Shanghai (CN); Wanghui Yan, Shanghai (CN); Tianhang Zheng, Shanghai (CN); Juan Bian, Shanghai (CN)

(73) Assignee: OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 15/681,646

(22) Filed: Aug. 21, 2017

(65) Prior Publication Data
US 2017/0347431 A1  Nov. 30, 2017

Related U.S. Application Data

(63) Continuation of application No. PCT/CN2016/085043, filed on Jun. 7, 2016.

(30) Foreign Application Priority Data

Jun. 8, 2015 (CN) .......................... 2015 1 0309709
Jun. 8, 2015 (CN) .......................... 2015 1 0310386
(Continued)

(51) Int. Cl.
  *H05B 37/02* (2006.01)
  *H05B 33/08* (2006.01)

(52) U.S. Cl.
CPC ....... *H05B 37/0218* (2013.01); *H05B 33/086* (2013.01); *H05B 33/0869* (2013.01); *H05B 33/0872* (2013.01)

(58) Field of Classification Search
CPC .............. H05B 33/086; H05B 33/0869; H05B 37/0218; H05B 33/0872
See application file for complete search history.

(56) References Cited

U.S. PATENT DOCUMENTS

| 7,990,083 B2 | 8/2011 | Deurenberg et al. |
| 8,342,719 B2 * | 1/2013 | Takase ...................... F21V 3/00 362/249.02 |

(Continued)

FOREIGN PATENT DOCUMENTS

| CN | 1781135 A | 5/2006 |
| CN | 1841164 | 10/2006 |

(Continued)

OTHER PUBLICATIONS

International Search Report (including English translation) issued in corresponding International Application No. PCT/CN2016/085043, dated Aug. 24, 2016, 10 pages.

(Continued)

*Primary Examiner* — Seokjin Kim
(74) *Attorney, Agent, or Firm* — Arch & Lake LLP

(57) ABSTRACT

Embodiments of the present disclosure disclose an illuminating device, a control method thereof and a control system thereof, which can acquire the color of an illuminated object and adjust irradiating light emitted by the illuminating device according to the color of the object. The control method includes switching on the illuminating device to project initial detection light to an illuminated object, acquiring initial reflected light of the illuminated object, obtaining an initial color of the illuminated object according to the initial reflected light, switching off the illuminating device (Continued)

projecting the initial detection light to the illuminated object, acquiring an environment color of an environment provided with the illuminating device, correcting the initial color according to the environment color to obtain a corrected color, acquiring target irradiating light according to the corrected color, and controlling the illuminating device to project the target irradiating light to the illuminated object.

13 Claims, 10 Drawing Sheets

(30) Foreign Application Priority Data

| | | |
|---|---|---|
| Jun. 8, 2015 | (CN) | 2015 1 0310390 |
| Jun. 8, 2015 | (CN) | 2015 1 0310436 |
| Jun. 8, 2015 | (CN) | 2015 2 0389892 U |
| Jun. 8, 2015 | (CN) | 2015 2 0390836 U |
| Jun. 8, 2015 | (CN) | 2015 2 0390858 U |
| Jun. 8, 2015 | (CN) | 2015 2 0394488 U |

(56) References Cited

U.S. PATENT DOCUMENTS

| | | | |
|---|---|---|---|
| 8,403,523 | B2 | 3/2013 | Gerlach et al. |
| 9,345,099 | B2 | 5/2016 | Baaijens et al. |
| 2004/0218387 | A1 | 11/2004 | Gerlach |
| 2008/0238339 | A1 | 10/2008 | Deurenberg et al. |
| 2009/0086192 | A1 | 4/2009 | He |
| 2010/0188022 | A1 | 7/2010 | Gerlach et al. |
| 2010/0327764 | A1* | 12/2010 | Knapp ............... H04L 12/43 315/287 |
| 2012/0013255 | A1 | 1/2012 | Young |
| 2013/0169796 | A1 | 7/2013 | Van Der Burgt |
| 2013/0214704 | A1 | 8/2013 | Gerlach et al. |
| 2013/0293116 | A1 | 11/2013 | Carreras Molins |
| 2013/0307419 | A1 | 11/2013 | Simonian |
| 2014/0152188 | A1* | 6/2014 | Bora ............ H05B 33/0863 315/210 |
| 2015/0230316 | A1* | 8/2015 | Baaijens ........ H05B 33/0869 315/153 |
| 2016/0100472 | A1 | 4/2016 | Baaijens et al. |
| 2017/0111973 | A1 | 4/2017 | Chiang |

FOREIGN PATENT DOCUMENTS

| | | |
|---|---|---|
| CN | 101167408 A | 4/2008 |
| CN | 101283628 A | 10/2008 |
| CN | 201340482 Y | 11/2009 |
| CN | 102042549 A | 5/2011 |
| CN | 102062638 A | 5/2011 |
| CN | 102265620 A | 11/2011 |
| CN | 102379002 A | 3/2012 |
| CN | 102640569 A | 8/2012 |
| CN | 102833485 | 12/2012 |
| CN | 102858072 A | 1/2013 |
| CN | 103299717 A | 9/2013 |
| CN | 103470992 A | 12/2013 |
| CN | 103857096 A | 6/2014 |
| CN | 104100924 A | 10/2014 |
| CN | 104344248 A | 2/2015 |
| CN | 104486861 A | 4/2015 |
| CN | 104488357 A | 4/2015 |
| CN | 104913273 A | 9/2015 |
| CN | 104913275 A | 9/2015 |
| CN | 104918372 A | 9/2015 |
| CN | 204704776 A | 10/2015 |
| CN | 105101535 A | 11/2015 |
| CN | 204929316 U | 12/2015 |
| CN | 204943358 U | 1/2016 |
| CN | 205142580 U | 4/2016 |
| JP | 2007080533 | 3/2007 |
| JP | 2011040241 A | 2/2011 |
| WO | 2008081387 A1 | 7/2008 |

OTHER PUBLICATIONS

Written Opinion issued in corresponding International Application No. PCT/CN2016/085043, dated Aug. 24, 2016, 5 pages.
Chinese Office Action (including English translation) issued in corresponding CN Patent Application No. 201510310418.7, dated Feb. 7, 2017, 10 pages.
Chinese Office Action (including English translation) issued in corresponding CN Patent Application No. 201510310436.5, dated Nov. 22, 2016, 9 pages.
International Search Report (including English translation) issued in corresponding International Application No. PCT/CN2016/085042, dated Aug. 24, 2016, 9 pages.
Written Opinion (including English translation) issued in corresponding International Application No. PCT/CN2016/085042, dated Aug. 24, 2016, 12 pages.
Chinese Office Action (including English tranlation) issued in corresponding CN Patent Application No. 201510310436.5, dated Apr. 27, 2017, 8 pages.
Chinese Office Action (including English tranlation) issued in corresponding CN Patent Application No. 201510310418.7, dated Feb. 7, 2017, 10 pages.
Chinese Office Action (including English tranlation) issued in corresponding CN Patent Application No. 201510310418.7, dated Sep. 12, 2017, 8 pages.
Chinese Supplemental Search issued in corresponding CN Patent Application 201510310436.5, dated Jul. 26, 2017, 2 pages.

* cited by examiner

ILLUMINATING DEVICE, CONTROL METHOD THEREOF AND CONTROL SYSTEM THEREOF

CROSS-REFERENCE TO RELATED APPLICATIONS

This application is based upon and claims the priority of PCT patent application No. PCT/CN2016/085043 filed on Jun. 7, 2016 which claims the priority of Chinese Patent Application No. 201510310436.5 filed on Jun. 8, 2015, Chinese Patent Application No. 201520390858.3 filed on Jun. 8, 2015, Chinese Patent Application No. 201510309709.4 filed on Jun. 8, 2015, Chinese Patent Application No. 201520389892.9 filed on Jun. 8, 2015, Chinese Patent Application No. 201510310386.0 filed on Jun. 8, 2015, Chinese Patent Application No. 201520394488.0 filed on Jun. 8, 2015, Chinese Patent Application No. 201510310390.7 filed on Jun. 8, 2015, and Chinese Patent Application No. 201520390836.7 filed on Jun. 8, 2015, the entire contents of all of which are hereby incorporated by reference herein for all purposes.

TECHNICAL FIELD

The present disclosure relates to the field of lighting technique, in particular to an illuminating device, a control method thereof and a control system thereof.

BACKGROUND

With the rapid development of lighting technique, illumination may not be confined to allow an illuminated object just to be illuminated, but may be escalated into a technique for enhancing the impression of the object by applying light effect in harmony with the color of the object to the illuminated object. The illuminating device can adaptively adjust the color of irradiating light of the illuminating device according to illuminated objects of different colors, so that the impression of the objects of different colors can all be enhanced. Thus, the illuminating device attracts the attention in the industry.

SUMMARY

The present disclosure discloses an illuminating device, a control method thereof and a control system thereof, which can acquire the color of an illuminated object and adjust irradiating light emitted by the illuminating device according to the color of the object.

In the present disclosure, a control method of an illuminating device is provided. The control method may include switching on the illuminating device to project initial detection light to an illuminated object; acquiring initial reflected light of the illuminated object; obtaining an initial color of the illuminated object according to the initial reflected light; switching off the illuminating device projecting the initial detection light to the illuminated object; acquiring an environment color of an environment provided with the illuminating device; correcting the initial color according to the environment color to obtain a corrected color; acquiring target irradiating light according to the corrected color; and controlling the illuminating device to project the target irradiating light to the illuminated object.

In the present disclosure, a control system of an illuminating device is also provided. The control system may include a detection light switching circuit for switching on the illuminating device to project initial detection light to an illuminated object; an initial reflected light acquiring circuit for acquiring initial reflected light of the illuminated object; an initial color operation circuit for obtaining an initial color of the illuminated object according to the initial reflected light; the detection light switching circuit being used for switching off the illuminating device projecting the initial detection light to the illuminated object; an environment color acquiring circuit for acquiring an environment color of an environment provided with the illuminating device; an initial color correcting circuit for correcting the initial color according to the environment color to obtain a corrected color; a target irradiating light acquiring circuit for acquiring target irradiating light according to the corrected color; and a target irradiating light start circuit for controlling the illuminating device to project the target irradiating light to the illuminated object.

In the present disclosure, an illuminating device is further provided. The illuminating device may include a light-emitting source, a power drive unit for adjusting the power supplied for the light-emitting source, and a control system that is electrically connected with the light-emitting source and the power drive unit.

In the illuminating device, the control system may include a detection light switching circuit for switching on the illuminating device to project initial detection light to an illuminated object; an initial reflected light acquiring circuit for acquiring initial reflected light of the illuminated object; an initial color operation circuit for obtaining an initial color of the illuminated object according to the initial reflected light; the detection light switching circuit being used for switching off the illuminating device projecting the initial detection light to the illuminated object; an environment color acquiring circuit for acquiring an environment color of an environment provided with the illuminating device; an initial color correcting circuit for correcting the initial color according to the environment color to obtain a corrected color; a target irradiating light acquiring circuit for acquiring target irradiating light according to the corrected color; and a target irradiating light start circuit for controlling the illuminating device to project the target irradiating light to the illuminated object.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

Figure 1:
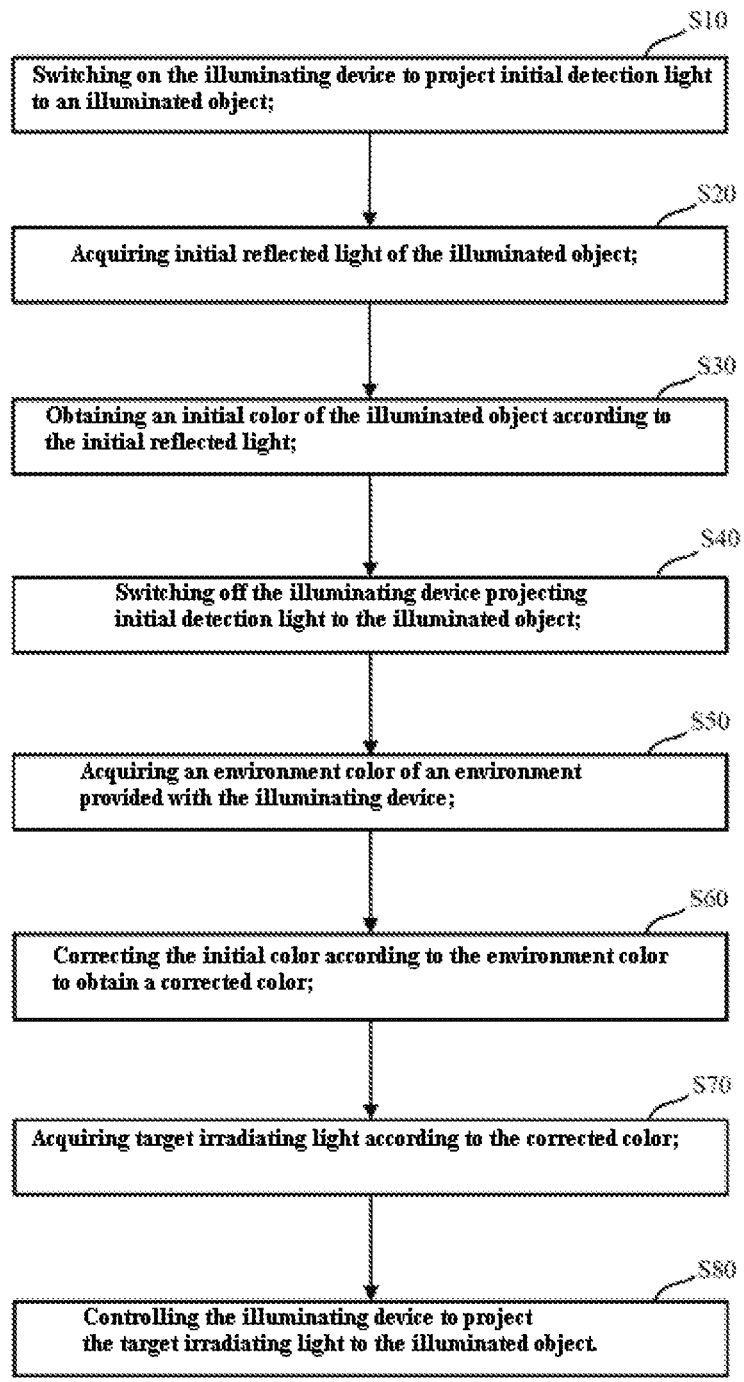
FIG. 1 is a flow chart of a control method of an illuminating device, provided by an embodiment of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Embodiments of the present disclosure provide an illuminating device, a control method thereof and a control system thereof.

In order to make the technical proposals of the present disclosure more understandable by those skilled in the art, the technical solutions according to the embodiments of the present disclosure are described clearly and fully as below in conjunction with the accompanying drawings of embodiments of the present disclosure. It is apparent that the described embodiments are just a part but not all of the embodiments of the present disclosure. Based on the described embodiments herein, a person of ordinary skill in the art can obtain other embodiment(s), without any creative work, which shall be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

In some examples, the color of the irradiating light emitted by the illuminating device is generally adaptively adjusted by the following steps:

S1: switching on the illuminating device to project detection light to an illuminated object, and acquiring reflected light of the illuminated object;

S2: obtaining the color of the illuminated object according to the reflected light;

S3: inquiring an irradiating light list according to the color, and acquiring target irradiating light; and S4: controlling the illuminating device to project the target irradiating light to the illuminated object.

At least the following problems exist:

as the environment provided with the illuminated object is inevitably provided with other objects or other illuminating devices, in the case of strong reflecting capacity of other objects to light, reflected light of other objects tend to be doped into the acquired reflected light of the illuminated object, so the color obtained according to the reflected light has large deviation from the true color of the illuminated object, and it is difficult for the illuminating device to select irradiating light coordinated with the true color of the illuminated object.

Thus, in the process of adjusting the irradiating light emitted by the illuminating device by acquiring different colors of the illuminated object via the projection of the detection light, the problem of difficult selection of the irradiating light coordinated with the true color of the illuminated object, caused by the large color recognition deviation of the object due to reflected light of other objects, may occur. The embodiments of the present disclosure provide a control method of an illuminating device for solving the above problem. Detailed description is given below to the method with reference to the accompanying drawings.

FIG. 1 is a flow chart of a control method of an illuminating device, provided by an embodiment of the present disclosure. An executive body of the control method may be a control circuit board mounted in the illuminating device. The control circuit board is provided with multiple elements, such as a micro control unit (MCU), and a sensor. The elements are electrically connected with a plurality of elements in the illuminating device, such as a light-emitting source, a power drive unit, and a possible power supply by wired or wireless means.

During the regular illumination of the illuminated object by the light-emitting source of the illuminating device, the control circuit board periodically starts the foregoing control method, so as to ensure that the irradiating light emitted by the light-emitting source of the illuminating device can be rapidly adjusted when the illuminated object is replaced.

The foregoing control method comprises the following steps.

S10: switching on the illuminating device to project initial detection light to the illuminated object.

In the embodiment of the present disclosure, the light-emitting source of the illuminating device may be adopted to project the initial detection light. In the process of starting the control method, the irradiating light originally emitted by the light-emitting source of the illuminating device is turned off in advance, then, the projection of the detection light is switched on.

Another independent auxiliary light-emitting source may also be disposed in the illuminating device. After the irradiating light originally emitted by the light-emitting source of the illuminating device is turned off, for the projection of the detection light through the auxiliary light-emitting source, the auxiliary light-emitting source is only required to be electrically connected with the drive unit and the power supply of the illuminating device. No further description will be given here.

In the embodiment of the present disclosure, the initial detection light may be white light, and the color temperature of the white light may be 2,000K-30,000K and may also be within a smaller range of 2,500-25,000K. As the white light has large optical width and there is no interference of light of other colors at the time, the reflected light of the illuminated object can be more accurately obtained.

The initial detection light may also adopt light of other colors except the white light. No further description will be given here.

No matter the light-emitting source of the illuminating device, or the independent auxiliary light-emitting source, a light-emitting diode (LED) may be used as the light source; light source paths formed by LED light sources of multiple colors are combined to form a mixed light array by using a RGB and RGBW light mixing mode; and the functions of dimming and color mixing can be achieved by using the drive unit to control the start and the brightness of the light source paths with the multiple colors.

No matter the light-emitting source of the illuminating device, or the independent auxiliary light-emitting source, other types, such as TL lamps, and halogen lamps may also be used. No further description will be given here.

S20: acquiring initial reflected light of the illuminated object.

In the embodiment of the present disclosure, a color recognition module facing the illuminated object may be disposed on the illuminating device. The color recognition module is adopted to acquire the initial reflected light on the basis of the initial detection light, and convert the initial reflected light into RGB electrical signals for embodying color. The technology is known by an ordinary skill in the art. No further description will be given here. The color recognition module may be a color sensor, a cadmium sulfide photoresistor described blow, or any other element capable of acquiring color.

S30: obtaining an initial color of the illuminated object according to the initial reflected light.

In the embodiment of the present disclosure, the initial color of the illuminated object may be obtained by the comparison between the ratio of the RGB electrical signals in the initial reflected light and a preset color table. The initial color is relevant to the preset color of the object, so that each initial color can embody one corresponding color of the illuminated object. Subsequently, the type of the illuminated object may also be obtained according to the application scene of the illuminating device.

The foregoing preset color table may be stored into a color memory. The color memory may be disposed in the executive body of the control method, namely the control circuit.

In other embodiments of the present disclosure, the initial color of the illuminated object may also be acquired by other ways. For instance, the reflected light may be detected by a cadmium sulfide photoresistor close to a sensitometric curve of the human eyes. As the photoresistor will have different resistance variations for different colors, the initial color may also be deducted according to the resistance variation. No further description will be given here.

S40: switching off the illuminating device projecting the initial detection light to the illuminated object.

In the embodiment of the present disclosure, in the process of executing the control method, the light-emitting source in the illuminating device is turned on and off to project the detection light to the illuminated object by modulating a PWM signal according to the preset pulse width, so that the illuminating device is periodically switched on and off to project the initial detection light to the illuminated object. In this way, the subsequent acquisition of the environment color of the environment provided with the illuminating device will not be affected by the irradiating light emitted by the illuminating device.

It is imperceptible by an observer for the "on" and "off" of the light-emitting source in the illuminating device by increasing the frequency of the PWM signal, so that the user experience can be guaranteed.

S50: acquiring an environment color of an environment provided with the illuminating device.

In the embodiment of the present disclosure, the color recognition module for collecting the reflected light may be adopted to acquire the environment color of the environment provided with the illuminating device. The environment color embodies multiple color impurities possibly being doped into the reflected light of the illuminated object, for instance, reflected light of other objects except the illuminated object or reflected light of other illuminating devices. As the projection of the initial detection light to the illuminated object via the illuminating device has been turned off, the acquired environment color will not be affected by the irradiating light emitted by the illuminating device, so the accuracy of the environment color can be guaranteed.

S60: correcting the initial color according to the environment color to obtain a corrected color.

The embodiment of the present disclosure obtains adjusted reflected light by correcting the initial reflected light of the illuminated object according to the environment color, and obtains the corrected color according to the adjusted reflected light, which can reduce the interference of the ambient light on the reflected light of the illuminated object, and obtain more precisely corrected color closer to the true color of the illuminated object.

Figure 2:
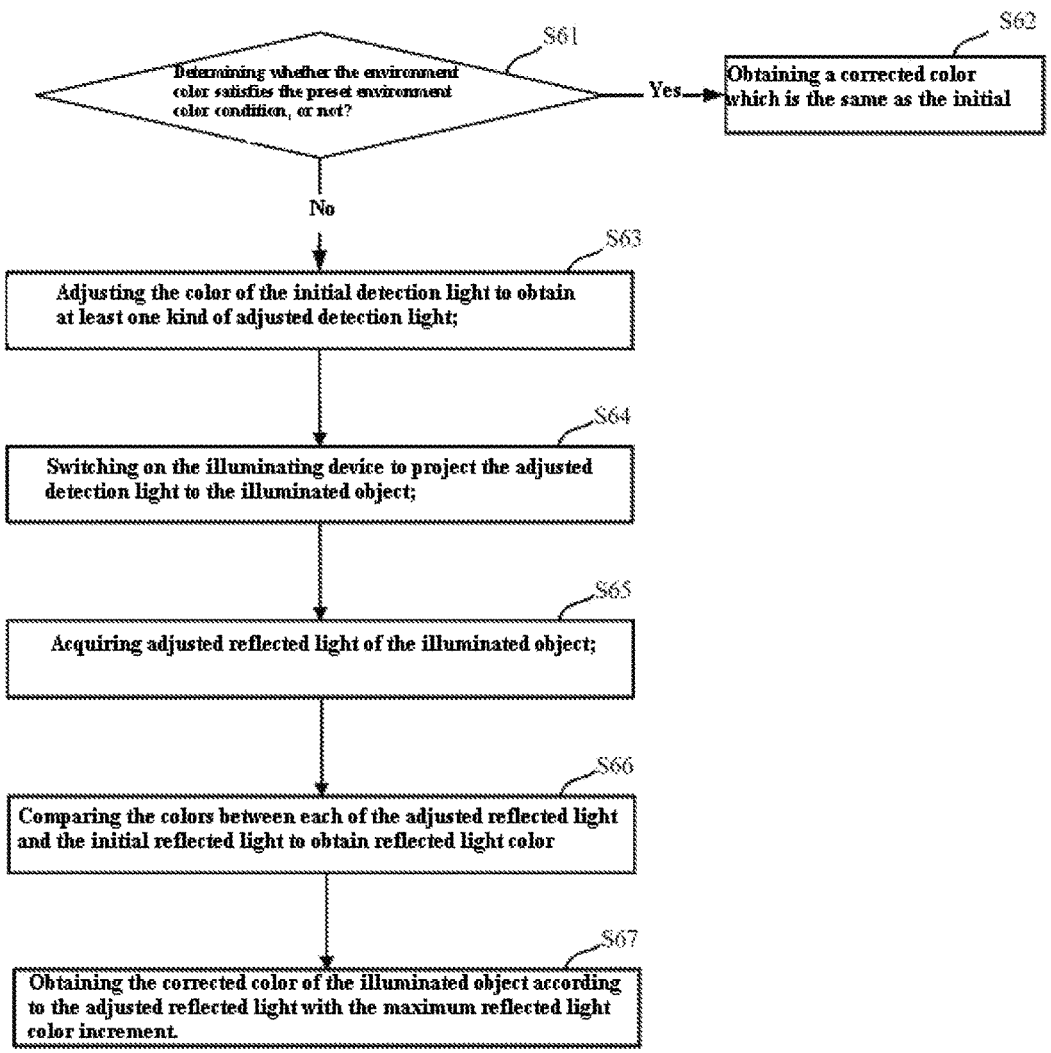
FIG. 2 is a specific flowchart illustrating the step of correcting the initial color according to the environment color to obtain a corrected color, in the control method of the illuminating device provided by an embodiment of the present disclosure.

With reference to FIG. 2, in the embodiment of the present disclosure, the step S60 specifically includes the following steps:

S61: determining whether the environment color satisfies the preset environment color condition, or not; if yes, executing the step S62; if no, executing the step S63.

The preset environment color condition specifically includes: the value of the environment color is lower than the preset environment color value. The preset light value may be preset according to the environment provided with the illuminating device. For instance, in a shopping mall with multiple ambient lights, the preset environment color value may be adaptively increased to reduce the interference of the ambient light on the reflected light of the illuminated object.

S62: obtaining a corrected color which is the same as the initial color.

When the environment color is within an acceptable range, the interference of the ambient light on the reflected light of the illuminated object may be ignored. At this point, the corrected color which is the same as the initial color is directly selected, and the acquired color of the illuminated object is basically the same as the true color of the illuminated object.

S63: adjusting the color of the initial detection light, and obtaining at least one kind of adjusted detection light.

When the environment color exceeds the acceptable range, the interference of the ambient light on the reflected light of the illuminated object is large, so the interference of the ambient light on the reflected light of the illuminated object is required to be reduced.

In the embodiment of the present disclosure, when the light-emitting source of the illuminating device is adopted to emit the detection light, all of the irradiating light having different colors from the initial detection light, capable of being emitted by the light-emitting source, may be acquired in advance, and the irradiating light is taken as the adjusted detection light.

Taking the case that the initial detection light is white light and the light-emitting source of the illuminating device can also emit light of RGB three primary colors as an example, the adjusted detection light may adopt at least one of the light of the RGB three primary colors.

The adjusted detection light is not limited to be the foregoing light of the RGB three primary colors and may also include light of other colors, such as pink and purple. No further description will be given here.

S64: switching on the illuminating device to project the adjusted detection light to the illuminated object.

S65: acquiring adjusted reflected light of the illuminated object.

In the embodiment of the present disclosure, taking the case that the adjusted detection light may adopt the light of the RGB three primary colors as an example, the light-emitting source of the illuminating device is turned on to sequentially project the adjusted irradiating light of the RGB three primary colors to the illuminated object, and the adjusted reflected light generated by the illuminated object is sequentially acquired.

S66: comparing the colors between each of the adjusted reflected light and the initial reflected light, and obtaining reflected light color increments.

Both the adjusted reflected light and the initial reflected light include two parts: one is the color impurities caused by multiple ambient lights; and the other is standard reflected light generated on the basis of the adjusted detection light or the initial detection light.

No matter the adjusted detection light or the initial detection light, the surrounding environment may be confirmed to be basically the same within a relatively short period of time, namely the color impurities caused by the ambient light are basically unchanged, so the reflected light color increments obtained by the differencing of the adjusted reflected light and the initial reflected light will not include the color impurities caused by the ambient light, namely the reflected light color increments will not be affected by the ambient light.

In the embodiment of the present disclosure, as light will be automatically converted into RGB values after being collected by the color recognition module, all the reflected light RGB increments may be obtained by the differencing of the RGB value of each of the adjusted reflected light and the RGB value of the initial reflected light, which is convenient for the calculating of the reelected light RGB increments.

S67: obtaining the corrected color of the illuminated object according to adjusted reflected light with maximum reflected light color increment.

Figure 3:
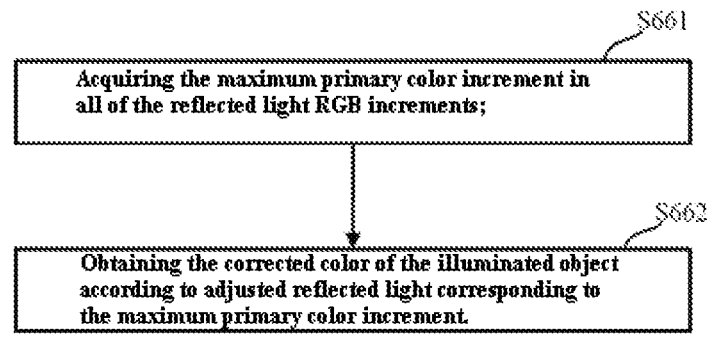
FIG. 3 is a specific flowchart illustrating the step of obtaining the corrected color of the illuminated object according to adjusted reflected light with maximum reflected light color increment, in the control method of the illuminating device provided by an embodiment of the present disclosure.

With reference to FIG. 3, in the embodiment of the present disclosure, the step S66 specifically includes the following steps:

S661: acquiring a maximum primary color increment in all of the reflected light RGB increments.

Each reflected light RGB increment includes values of RGB three primary colors; three groups of primary color increments are obtained by differencing two reflected light RGB increments, namely differencing the values of the RGB three primary colors, respectively; and the three groups of primary color increments are gathered to be the reflected light RGB increment.

Taking the case that the adjusted detection light may adopts the light of the RGB three primary colors as an example, the obtained 3 groups of reflected light RGB increments are specifically as shown in Table 1.

TABLE 1

| | Adjusted Detection Light | | |
|---|---|---|---|
| | R | G | B |
| Reflected Light RGB Increment | (65, 15, 20) | (25, 40, 23) | (18, 35, 38) |

It can be apparently obtained from the data in the Table 1 that: when the adjusted detection light is R light, the R increment in the reflected light RGB increment is 65 and is greater than the maximum G increment 40 and the maximum B increment 38, so the maximum primary color increment is disposed in the reflected light RGB increment when the adjusted detection light is R light.

S662: obtaining the corrected color of the illuminated object according to adjusted reflected light corresponding to the maximum primary color increment.

According to the principle that the object has the strongest reflecting capacity on light of the same color, it can be obtained that the true color of the illuminated object is closer to red. Thus, the corrected color is obtained by correcting the initial color towards red.

The magnitude of correcting the initial color towards red may be preset according to the range of the maximum primary color increment. When the maximum primary color increment is larger, the initial color may be closer to the maximum primary color. The technology is known by an ordinary skill in the art. No further description will be given here.

S70: acquiring target irradiating light according to the corrected color.

In the embodiment of the present disclosure, in the step S70, the target irradiating light may be obtained by inquiring a preset irradiating light list according to the corrected color. The irradiating light list is preset according to the environment provided with the illuminating device and the type of the illuminated object, and it includes a plurality of color ranges of the illuminated object and the color of irradiating light corresponding to each color range.

For instance, when the illuminating device is applied in a supermarket and the illuminated object is meat, vegetables, or other goods, it can be obtained that the goods are mostly coordinated with irradiating light of which colors by experiences on the goods, such as meat, and vegetables, and finally the color data are gathered to obtain the foregoing irradiating light list.

In other embodiments of the present disclosure, in the step S70, the target irradiating light may also be obtained by the following steps:

controlling the illuminating device to project initial irradiating light to the illuminated object, in which the color of the initial irradiating light is the corrected color;

acquiring the color of reflected light generated by the illuminated object on the basis of the initial irradiating light;

acquiring a target color according to the color of the reflected light generated on the basis of the initial irradiating light;

controlling the illuminating device to project irradiating light to be selected to the illuminated device, in which the color of the irradiating light to be selected is the target color;

acquiring the color of reflected light generated by the illuminated object on the basis of the irradiating light to be selected; and determining whether the color difference between the reflected light generated on the basis of the initial irradiating light and the reflected light generated on the basis of the irradiating light to be selected is within a preset color difference range, if yes, taking the irradiating light to be selected as the target irradiating light.

S80: controlling the illuminating device to project the target irradiating light to the illuminated object.

The control method provided by the embodiment of the present disclosure corrects the initial reflected light of the illuminated object by acquiring the environment color, which can reduce the interference of the ambient light on the reflected light of the illuminated object, and obtain more precisely corrected color closer to the true color of the illuminated object, so that the illuminating device can select irradiating light coordinated with the true color of the illuminated object.

Figure 4:
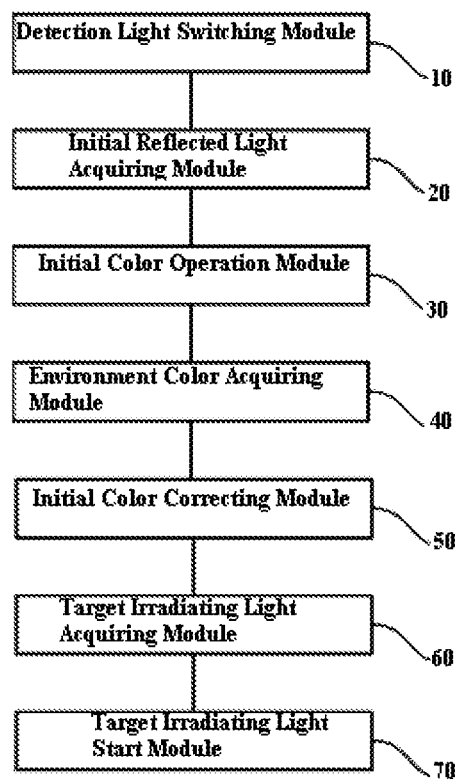
FIG. 4 is a block diagram of a control system of an illuminating device, provided by an embodiment of the present disclosure.

FIG. 4 is a block diagram of a control system of an illuminating device, provided by an embodiment of the present disclosure.

The control system may be operated via a control circuit board mounted in the illuminating device. The control circuit board includes multiple elements, such as an MCU, and a sensor. The elements are electrically connected with a plurality of elements in the illuminating device, such as a light-emitting source, a power drive unit, and a possible power supply.

During the regular illumination of the illuminated object by the light-emitting source of the illuminating device, the control circuit board periodically starts the foregoing control system, so as to ensure that the irradiating light emitted by the light-emitting source of the illuminating device can be rapidly adjusted when the illuminated object is replaced.

The foregoing control system comprises the following modules:

A detection light switching module 10 is used for switching on the illuminating device to project initial detection light to the illuminated object.

In the embodiment of the present disclosure, the light-emitting source of the illuminating device may be adopted to project the initial detection light. In the process of starting the control system, the irradiating light originally emitted by the light-emitting source of the illuminating device is turned off in advance, and subsequently the illuminating device is switched on to project the detection light.

Another independent auxiliary light-emitting source may also be disposed in the illuminating device. After the irradiating light originally emitted by the light-emitting source of the illuminating device is turned off, for the projection of the detection light through the auxiliary light-emitting source, the auxiliary light-emitting source is only required to be electrically connected with the drive unit and the power supply of the illuminating device. No further description will be given here.

In the embodiment of the present disclosure, the initial detection light may be white light, and the color temperature of the white light may be 2,000K-30,000K and may also be within a smaller range of 2,500-25,000K. As the white light has large optical width and there is no interference of light of other colors at the time, the reflected light of the illuminated object can be more accurately obtained.

The initial detection light may also adopt light of other colors except the white light. No further description will be given here.

No matter the light-emitting source of the illuminating device or the independent auxiliary light-emitting source, an LED may be used as the light source; light source paths formed by LED light sources of multiple colors are combined to form a mixed light array by using a RGB and RGBW light mixing mode; and the functions of dimming and color mixing can be achieved by using the drive unit to control the start and the brightness of the light source paths of the multiple colors.

No matter the light-emitting source of the illuminating device, or the independent auxiliary light-emitting source, other types, such as TL lamps, and halogen lamps, may also be used. No further description will be given here.

An initial reflected light acquiring module 20 used for acquiring initial reflected light of the illuminated object.

In the embodiment of the present disclosure, the color recognition module facing the illuminated object may be disposed on the illuminating device. The color recognition module is adopted to acquire reflected light on the basis of the initial detection light, and convert the reflected light into initial reflected light embodied in the form of RGB electrical signals. The technology is known by an ordinary skill in the art. No further description will be given here.

An initial color operation module 30 is used for obtaining initial color of the illuminated object according to the initial reflected light.

In the embodiment of the present disclosure, the initial color of the illuminated object may be obtained by the comparison between the ratio of the RGB electrical signals in the initial reflected light and a preset color table. The initial color is relevant to the preset color of the object, so that each initial color can embody one corresponding color of the illuminated object. Subsequently, the type of the illuminated object may also be obtained according to the application scene of the illuminating device.

The foregoing preset color table may be stored into a color memory. The color memory may be disposed in an executive body, namely a control circuit, of the control system.

In other embodiments of the present disclosure, the initial color of the illuminated object may also be acquired by other ways. For instance, the reflected light may be detected by a cadmium sulfide photoresistor close to a sensitometric curve of the human eyes. As the photoresistor will have different resistance variations for different colors, the initial color may also be deducted according to the resistance variation. No further description will be given here.

The detection light switching module 10 is also used for switching off the illuminating device projecting the initial detection light to the illuminated object.

In the embodiment of the present disclosure, in the operation of the control system, the detection light switching module and the detection light switching module may be disposed in the same controller, and the illuminating device is switched on and off to project the detection light to the illuminated object by modulating a PWM signal according to the preset pulse width inputted into the controller.

The light-emitting source in the illuminating device is turned on and off to project the detection light to the illuminated object by modulating the PWM signal according to the preset pulse width, so that the illuminating device is periodically switched on and off to project the initial detection light to the illuminated object.

It is imperceptible by an observer for the "on" and "off" of the light-emitting source in the illuminating device by increasing the frequency of the PWM signal, so that the user experience can be guaranteed.

An environment color acquiring module 40 is used for acquiring environment color of an environment provided with the illuminating device.

In the embodiment of the present disclosure, the color recognition module for collecting the reflected light may be adopted to acquire the environment color of the environment provided with the illuminating device. The environment color embodies multiple color impurities possibly being doped into the reflected light of the illuminated object, for instance, reflected light of other objects except the illuminated object, or reflected light of other illuminating devices. As the projection of the initial detection light to the illuminated object by the illuminating device has been turned off, the acquired environment color will not be affected by the irradiating light emitted by the illuminating device, so the accuracy of the environment color can be guaranteed.

An initial color correcting module 50 is used for correcting the initial color according to the environment color to obtain a corrected color.

The embodiment of the present disclosure obtains adjusted reflected light by correcting the initial reflected light of the illuminated object according to the environment color, and obtains the corrected color according to the adjusted reflected light, which can reduce the interference of the ambient light on the reflected light of the illuminated object, and obtain more precisely corrected color closer to the true color of the illuminated object.

In the embodiment of the present disclosure, the initial color correcting module 50 includes:

A preset condition determination module specifically used for determining whether the environment color satisfies the preset environment color condition, or not.

The preset environment color condition specifically includes: the value of the environment color is lower than the preset environment color value. The preset light value may be preset according to the environment provided with the illuminating device. For instance, in a shopping mall with multiple ambient lights, the preset environment color value may be adaptively increased, so as to reduce the interference of the ambient light on the reflected light of the illuminated object.

A correction execution module is used for obtaining a corrected color which is the same as the initial color when the environment color satisfies the preset condition.

When the environment color is within an acceptable range, the interference of the ambient light on the reflected light of the illuminated object may be ignored. At this point, the corrected color which is the same as the initial color is directly selected, and the acquired color of the illuminated object is basically the same as the true color of the illuminated object.

The correction execution module is used for adjusting the color of the initial detection light and obtaining at least one kind of adjusted detection lights when the environment color does not satisfy the preset condition.

When the environment color exceeds the acceptable range, the interference of the ambient light on the reflected light of the illuminated object is large, so the interference of the ambient light on the reflected light of the illuminated object is required to be reduced.

In the embodiment of the present disclosure, when the light-emitting source of the illuminating device is adopted to emit the detection light, all of the irradiating light having different colors from the initial detection light, capable of being emitted by the light-emitting source, may be acquired in advance, and the irradiating light is used as the adjusted detection light.

Taking the case that the initial detection light is white light and the light-emitting source of the illuminating device can also emit light of RGB three primary colors as an example, the adjusted detection light may adopt at least one of the lights of the RGB three primary colors.

The adjusted detection light is not limited to be the foregoing light of the RGB three primary colors and may also include light of other colors, such as pink, or purple. No further description will be given here.

An adjusted detection light switching module is used for switching on the illuminating device to project adjusted detection light to the illuminated object, and acquiring adjusted reflected light of the illuminated object.

In the embodiment of the present disclosure, taking the case that the adjusted detection light may adopt the light of the RGB three primary colors as an example, the light-emitting source of the illuminating device is turned on to sequentially project the adjusted irradiating light of the RGB three primary colors to the illuminated object, and the adjusted reflected light generated by the illuminated object is sequentially acquired.

A reflected light color increment operation module is used for obtaining reflected light color increments by the comparison of the color between each of the adjusted reflected light and the initial reflected light in turn.

Both the adjusted reflected light and the initial reflected light include two parts: one is the color impurities caused by multiple ambient lights; and the other is standard reflected light generated on the basis of the adjusted detection light, or the initial detection light.

No matter the adjusted detection light, or the initial detection light, the surrounding environment may be confirmed to be basically the same within a relatively short period of time, namely the color impurities caused by the ambient light are basically unchanged, so the reflected light color increments obtained by the differencing of the adjusted reflected light and the initial reflected light will not include the color impurities caused by the ambient light, namely the reflected light color increments will not be affected by the ambient light.

In the embodiment of the present disclosure, as light will be automatically converted into RGB values after being collected by the color recognition module, all of the reflected light RGB increments may be obtained by the differencing of the RGB value of each of the adjusted reflected light and the RGB value of the initial reflected light, which is convenient for calculating the reelected light RGB increments.

A corrected color operation module is used for obtaining a corrected color of the illuminated object according to adjusted reflected light with the maximum reflected light color increment.

In the embodiment of the present disclosure, the reflected light color increment operation module specifically includes:

a maximum primary color increment acquiring module used for acquiring the maximum primary color increment in all of the reflected light RGB increments.

Each reflected light RGB increment includes values of RGB three primary colors; three groups of primary color increments are obtained by the differencing of two reflected light RGB increments, namely differencing the values of the RGB three primary colors, respectively; and the three groups of primary color increments are gathered to be the reflected light RGB increment.

Taking the case that the adjusted detection light may adopt the light of the RGB three primary colors as an example, the obtained three groups of reflected light RGB increments are specifically shown in Table 2.

TABLE 2

| Adjusted Detection Light | Red | Green | Blue |
|---|---|---|---|
| Reflected Light RGB Increment | (65, 15, 20) | (25, 40, 23) | (18, 35, 38) |

It can be apparently obtained from data in the Table 2 that: when the adjusted detection light is R light, the R increment in the reflected light RGB increment is 65 and is greater than the maximum G increment 40 and the maximum B increment 38, so the maximum primary color increment is disposed in the reflected light RGB increment when the adjusted detection light is R light.

A maximum primary color increment processing module is used for obtaining the corrected color of the illuminated object according to adjusted reflected light corresponding to the maximum primary color increment.

According to the principle that the object has the strongest reflecting capacity on light of the same color, it can be obtained that the true color of the illuminated object is closer to red. In this way, the corrected color is obtained by correcting the initial color towards red.

The magnitude of correcting the initial color towards red may be preset according to the range of the maximum primary color increment. When the maximum primary color increment is larger, the initial color may be closer to the maximum primary color. The technology is known by an ordinary skill in the art. No further description will be given here.

A target irradiating light acquiring module 60 is used for acquiring target irradiating light according to the corrected color.

In the embodiment of the present disclosure, the target irradiating light acquiring module 60 obtains the target irradiating light by inquiring a preset irradiating light list according to the corrected color. The irradiating light list is preset according to the environment provided with the illuminating device and the type of the illuminated object, and it includes a plurality of color ranges of the illuminated object and the color of irradiating light corresponding to each color range.

For instance, when the illuminating device is applied in a supermarket and the illuminated object is meat, vegetables, or other goods, it can be obtained that the goods are mostly coordinated with irradiating light of which colors by experiences on the goods, such as meat, and vegetables, and finally the color data are gathered to obtain the foregoing irradiating light list.

In other embodiments of the present disclosure, the target irradiating light acquiring module 60 may also obtain the target irradiating light by the following ways:

controlling the illuminating device to project initial irradiating light to the illuminated object, in which the color of the initial irradiating light is the corrected color;

acquiring the color of reflected light generated by the illuminated object on the basis of the initial irradiating light;

acquiring target color according to the color of the reflected light generated on the basis of the initial irradiating light;

controlling the illuminating device to project irradiating light to be selected to the illuminated device, in which the color of the irradiating light to be selected is the target color;

acquiring the color of reflected light generated by the illuminated object on the basis of the irradiating light to be selected; and determining whether the color difference between the reflected light generated on the basis of the initial irradiating light and the reflected light generated on the basis of the irradiating light to be selected is within a preset color difference range, is yes, taking the irradiating light to be selected as the target irradiating light.

A target irradiating light start module 70 is used for controlling the illuminating device to project the target irradiating light to the illuminated object.

Figure 5:
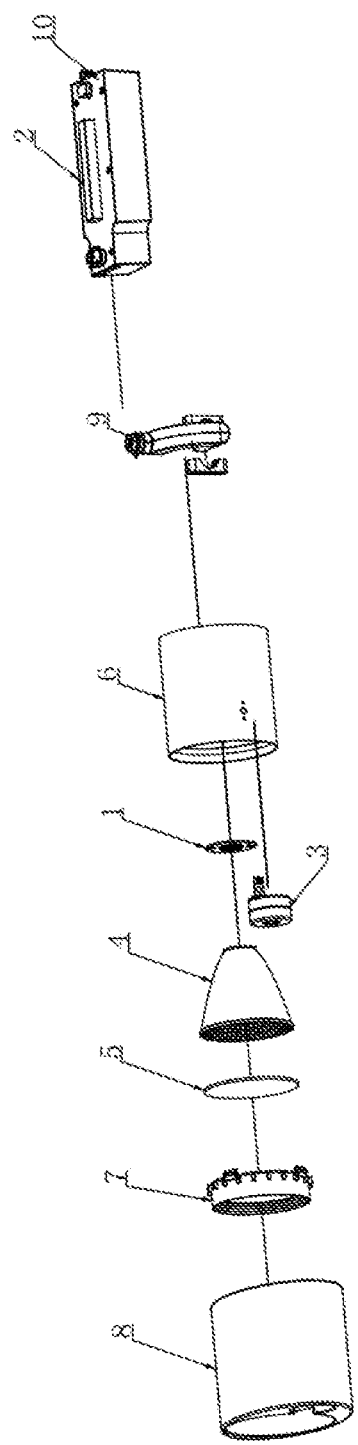
FIG. 5 is an assembly diagram of an illuminating device provided by an embodiment of the present disclosure.

FIG. 5 is a schematic structural view of an illuminating device comprising the foregoing control system and employing the foregoing control method. The illuminating device comprises a light-emitting source 1, a reflecting shade 4, a transmitting shade 5 and a lamp body 6, wherein the reflecting shade 4 covers the light-emitting source 1 and is expanded out towards the light-emitting direction of the light-emitting source 1, so as to adjust or control the light-emitting direction of the light-emitting source 1. The transmitting cover 5 covers a light outlet of the reflecting shade 4 for the optical control of final light emitting. A reflector holder 7 covers the transmitting shade 5 and is disposed on a light outlet of the lamp body 6, so as to fix components accommodated in the lamp body 6.

The illuminating device further comprises a color recognition module 3 fixed on one side of the lamp body 6, and the detection direction of the color recognition module is consistent with the light-emitting direction of the light-emitting source 1 and is roughly parallel and level to the light outlet of the reflecting shade 4 and the transmitting shade 5. The color recognition module 3 is integrated onto the illuminating device and used for being cooperated with the reflected light acquiring module 20, the environment color acquiring module 40 and the target irradiating light acquiring module 60 to acquire the color of the reflected light generated by the illuminated object on the basis of the irradiating light and/or the environment color of the environment provided with the illuminating device. The illuminating device further comprises a control circuit board 2 for periodically starting the foregoing control method, so as to ensure that the irradiating light emitted by the light-emitting source 1 of the illuminating device can be rapidly adjusted when the illuminated object is replaced.

A lamp body shade 8 is provided with an opening corresponding to the light exiting direction of the reflecting shade 4 fixed on the reflector holder 7 and the detection direction of the color recognition module 3, so as to provide convenience for light exiting and detection while providing fixing, protection and aesthetic property by covering the outside of the lamp body 6 and the color recognition module 3. A rotary support 9 is disposed at the rear of the lamp body 6 and connected with the control circuit board 2 and a power supply module 19, wherein the color recognition module 3 transmits data information of the illuminated object in the illumination direction of the light-emitting source 1, detected by the color recognition module, to the control circuit board 2 through the rotary support 9; subsequently, the control circuit board 2 is adopted to feed back corresponding light effect adjustment instruction; then the power supply module 19 controls the light-emitting source 1 to output corresponding light effect according to the corresponding light effect adjustment instruction.

Specifically, the light-emitting source 1 further includes: a light source unit, in which the light source unit preferably adopts an LED as a light source; light source paths formed by LED light sources of multiple colors are combined to form a mixed light array by using a RGB and RGBW light mixing mode; the functions of dimming and color mixing can be achieved by using the power supply module 19 to control the start and the brightness of the light source paths of multiple colors; thereby, the required light effect can be simulated and obtained.

FIGS. 6-9 and 10-13 respectively show the illuminating device provided with a color recognition module 100 in different embodiments.

As shown in FIGS. 6-9, in an embodiment, the color recognition module 100 includes: a housing 101, a PCB 102 accommodated in the housing 101, an optical lens 103 and a color detector 104 assembled on one side of the PCB 102, and a connector 105 assembled on the other side of the PCB 102.

Detailed description will be given below to elements in the color recognition module 100 in the preferred embodiment.

Figure 6:
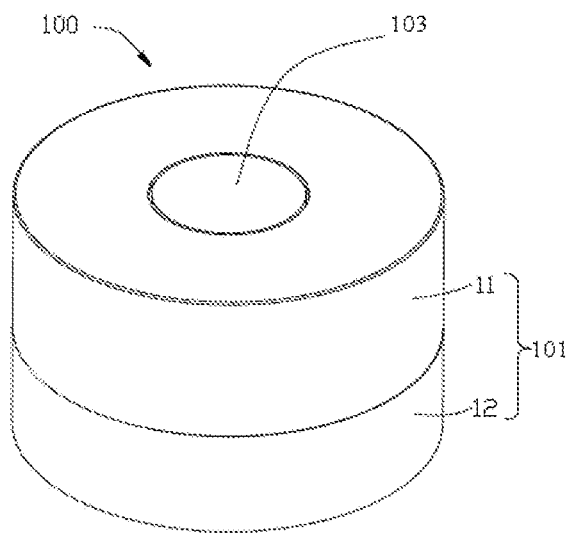
FIG. 6 is a perspective assembly diagram of a color recognition module in the preferred embodiment of the present disclosure.
Figure 7:
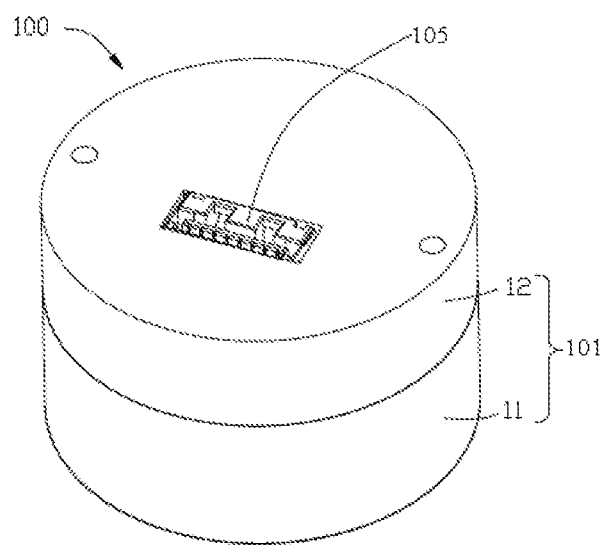
FIG. 7 is a perspective assembly diagram of the color recognition module in the preferred embodiment of the present disclosure, from another view.
Figure 8:
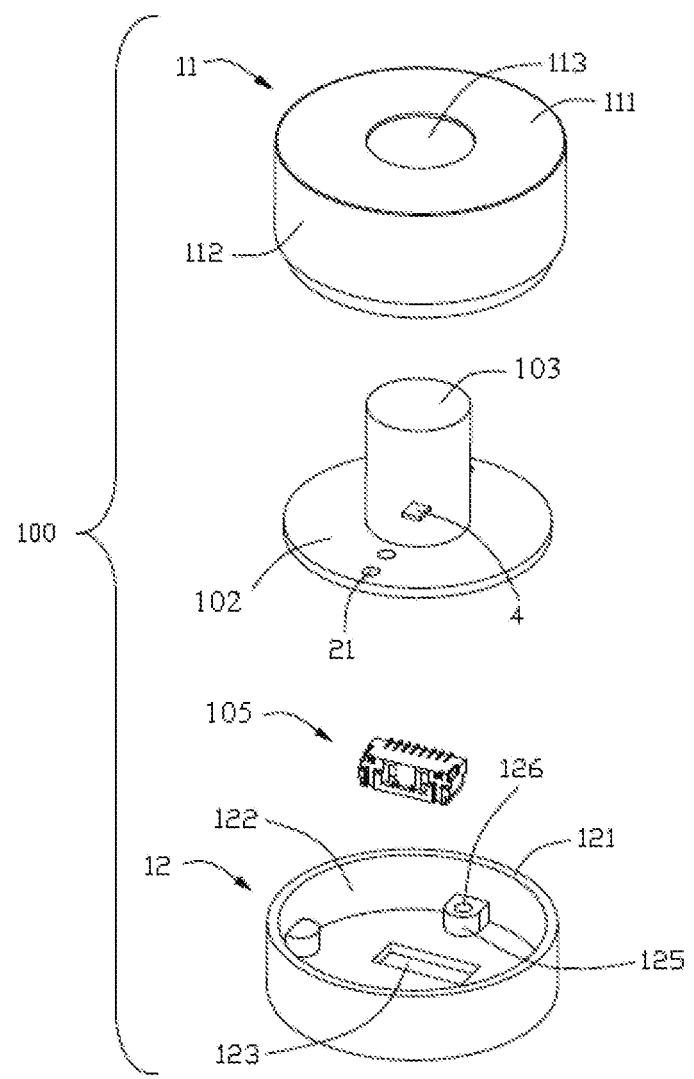
FIG. 8 is a perspective exploded view of FIG. 6.
Figure 9:
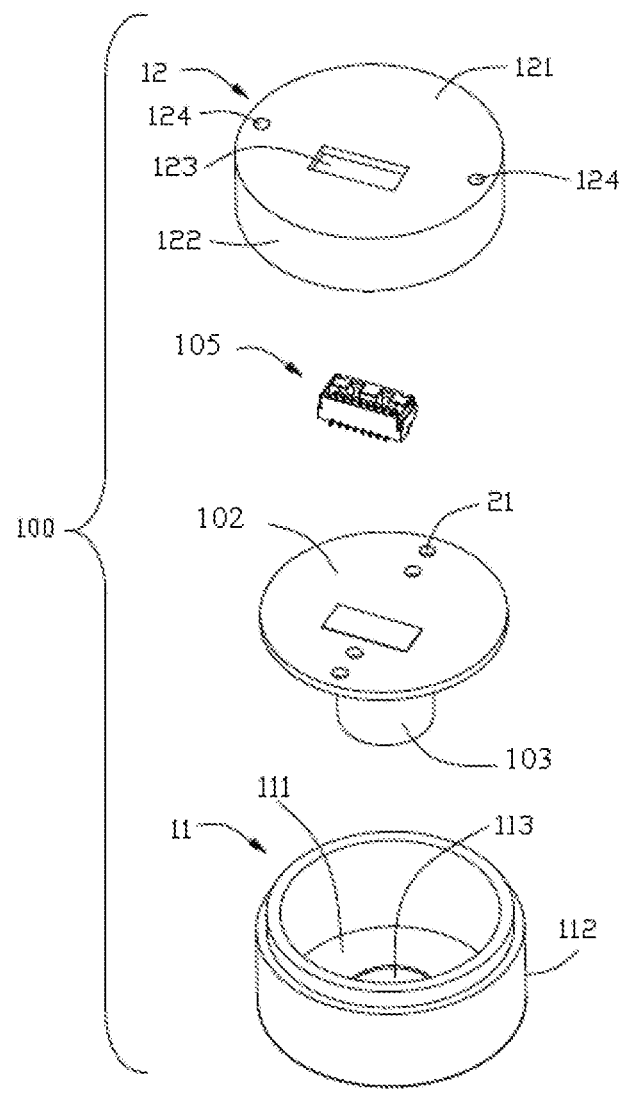
FIG. 9 is a perspective exploded view of FIG. 7.

As shown in FIGS. 6, 8 and 9, the housing 101 is made of insulating material(s) and includes a first cover body 11 and a second cover body 12 assembled together. The first cover body 11 includes a circular top wall 111 and a first side wall 112 extended from a side surface of the top wall 111. The top wall 111 of the first cover body 11 is provided with a first through hole 113 through which the lens 3 is exposed, and the first through hole 113 is circular. The second cover body 12 includes a bottom wall 121 and a second side wall 122 extended from a side surface of the bottom wall 121. The bottom wall 121 of the second cover body 12 is provided with a second through hole 123 through which the connector 105 is exposed, and two mounting holes 124 for the color recognition module 100 to be rapidly mounted on the illuminating device (not shown), and the second through hole 123 is rectangular. The second cover body 12 is also provided with a plurality of supporting blocks 125 disposed on an interface of the bottom wall 121 and the second side wall 122, in which at least two supporting blocks 125 are respectively provided with screw holes. The first cover body 11 and the second cover body 12 may be fastened together by the threaded connection between the first side wall 112 and the second side wall 122.

As shown in FIGS. 8 and 9, the PCB 102 is circular and is disposed on the plurality of supporting blocks 125 in the second cover body 12. Positioning holes 21 are formed on and run through the PCB 2. The PCB 102 and the second cover body 12 may be positioned by bolts (not shown).

As shown in FIGS. 6, 8 and 9, the optical lens 103 is cylindrical, and one end of the optical lens is accommodated into and extended to the first through hole 113, so that the optical lens can receive external light. The main functions of the optical lens 103 include: collecting light within a specific range according to different specifications of the selected optical lens; and adjusting the intensity of light reaching a surface of the color detector 104, in which the light travels through the optical lens.

The color detector 104 may be a color sensor, a spectral detector, a cadmium sulfide photoresistor, or any other element capable of acquiring colors. The color detector 104 is fixed on the PCB 102 and disposed between the optical lens 103 and the PCB 102. The external light arrives at the surface of the color detector 104 after travelling through the optical lens 103. The color detector 104 collects the reflected light of the illuminated object and outputs proper electric parameters according to the reflected light; and color information is obtained after the signal processing of the obtained electrical parameters, namely surface color information of the illuminated object is obtained. It should be noted that the color information includes the relative intensity of R, G, and B components. The RGB color mode is a color standard in the industry, which obtains a variety of colors by the variation of three RGB channels and the superposition of each other. R, G and B represent the color of the three RGB channels.

The connector 105 may be welded on the PCB 102 by surface mount technology (SMT).

The color recognition module 100 in the preferred embodiment is assembled by the following steps. The specific steps include:

assembling the optical lens 103, the color detector 104 and the connector 105 on the PCB 102 to form an assembly; and assembling the above assembly and fixing the assembly on the second cover body 12; and assembling the first cover body 11 on the second cover body.

By adoption of the above steps, the color recognition module 100 is assembled.

As shown in FIGS. 10-13, in another embodiment, a color recognition module 100' includes: a housing 101', a PCB 102' accommodated in the housing 101', an optical lens 103' and a color detector 104' assembled on one side of the PCB 102', and a connector 105' assembled on the other side of the PCB 102'. The color recognition module 100' also includes a first fastener 106' assembled on the housing 101'. The illuminating device includes a second fastener 107' cooperating with the first fastener 106' in a locking manner.

Detailed description will be given below to the elements in the color recognition module 100' in the preferred embodiment.

Figure 10:
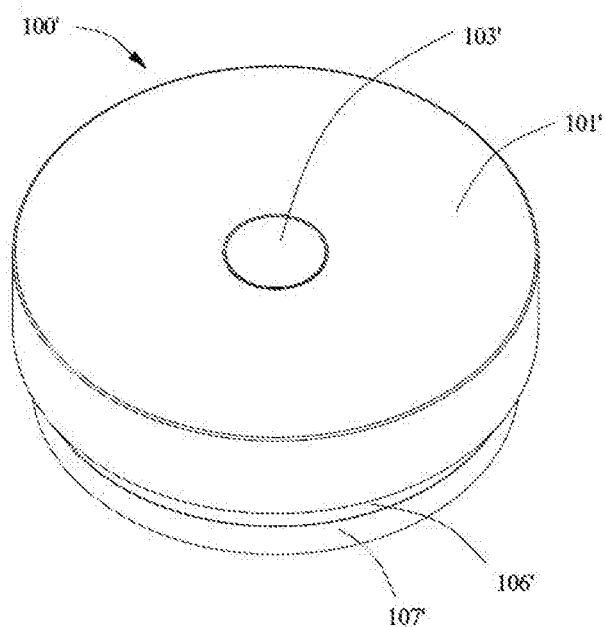
FIG. 10 is a perspective assembly diagram of a color recognition module provided by another preferred embodiment of the present disclosure.
Figure 11:
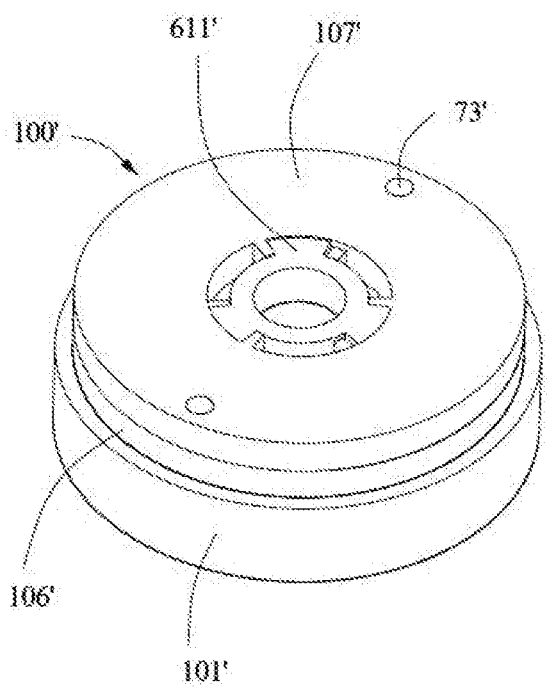
FIG. 11 is a perspective assembly diagram of the color recognition module provided by another preferred embodiment of the present disclosure, from another view.
Figure 12:
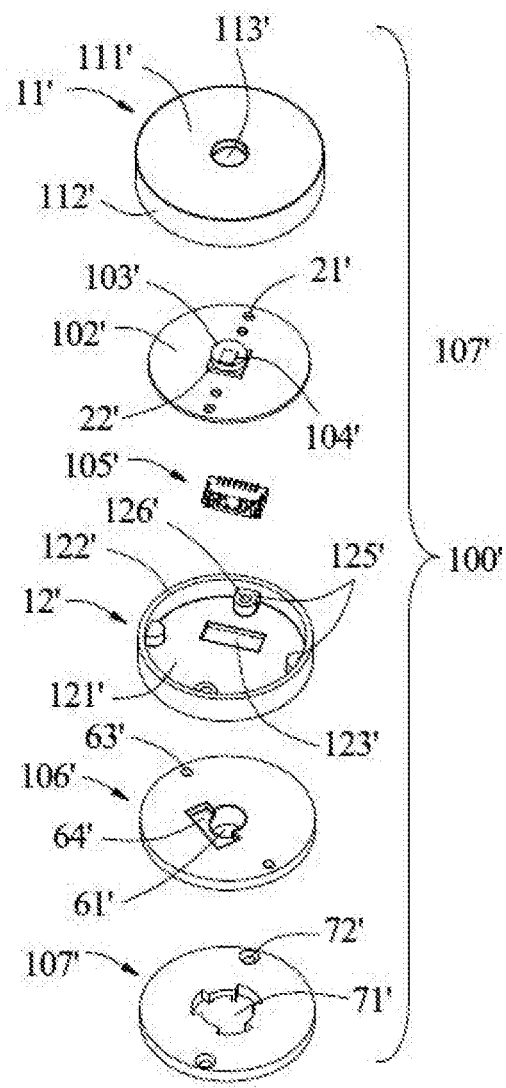
FIG. 12 is a perspective exploded view of FIG. 10.
Figure 13:
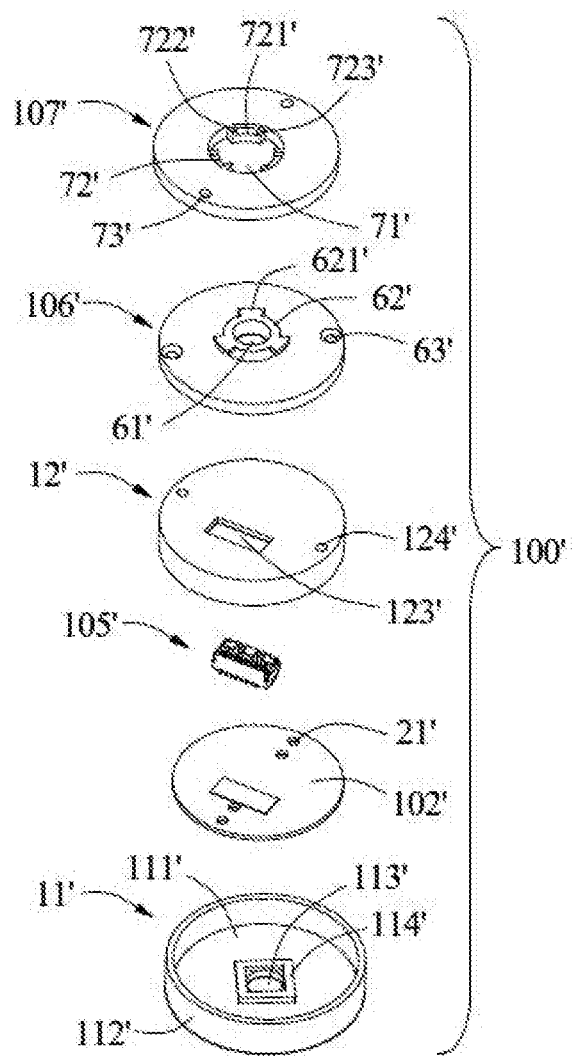
FIG. 13 is a perspective exploded view of FIG. 11.

As shown in FIGS. 10, 12 and 13, the housing 101' is made of insulating material(s) and includes a first cover body 11' and a second cover body 12' assembled together. The first cover body 11' includes a circular top wall 111' and a first side wall 112' extended from a side surface of the top wall 111'. The top wall 111' of the first cover body 11' is provided with a first through hole 113' through which the optical lens 103' is exposed, and the first through hole 113' is circular. The lens 103' can be communicated with the outside via the first through hole 113'. An inner surface of the top wall 111' is also provided with a rectangular ring rib 114'. The rib 114' is disposed around the first through hole 113'. The second cover body 12' includes a bottom wall 121' and a second side wall 122' extended from a side surface of the bottom wall 121'. The bottom wall 121' of the second cover body 12' is provided with a second through hole 123' through which the connector 105' is exposed and two mounting holes 124', and the second through hole 123' is rectangular. The connector 105' can be communicated with the outside of the housing 101' via the second through hole 123'. The second cover body 12' is also provided with a plurality of supporting blocks 125' disposed on an interface of the bottom wall 121' and the second side wall 122', in which at least two supporting blocks 125' are respectively provided with screw holes 126'. The first cover body 11' and the second cover body 12' are fastened together by the threaded connection between the first side wall 112' and the second side wall 122'.

The PCB 102' is circular and is disposed on the plurality of supporting blocks 125' in the second cover body 12'. Positioning holes 21' are formed on and run through the PCB 102'. The PCB 102' includes a positioning block 22'. The PCB 102' and the second cover body 12' may be positioned by bolts (not shown). The positioning block 22' is accommodated in an accommodating space (not marked) encircled by the rectangular ring rib 114', so as to position the PCB 102' and the first cover body 11'.

The optical lens 103' is cylindrical and is disposed on the positioning block 22' of the PCB 102'. The optical lens 103' is accommodated in and extended to the first through hole 113'. The main functions of the optical lens 103' include: collecting light within a specific range according to different specifications of the selected optical lens 103', for instance, collecting ambient light or light emitted by an object; and adjusting the intensity of light reaching a surface of the color detector 104', in which the light travelling through the optical lens 103'.

The color detector 104' can be a color sensor, a spectral detector, a cadmium sulfide photoresistor, or any other element capable of acquiring colors. The color detector 104' is fixed on the PCB 102' and disposed between the optical lens 103' and the PCB 102'. The external light arrives at the surface of the color detector 104' after travelling through the optical lens 103'. The color detector 104' collects the reflected light of the illuminated object and outputs proper electric parameters according to the reflected light; and color information is obtained after the signal processing of the obtained electrical parameters, namely surface color information of the illuminated object is obtained. It should be noted that the color information includes the relative intensity of R, G, and B components, namely chromaticity coordinate points of the colors. The RGB color mode is a color standard in the industry, which obtains a variety of colors by the variation of three RGB channels and the superposition of each other. R, G, and B represent the color of the three RGB channels.

The connector 105' may be welded on the PCB 102' by SMT (Surface Mount Technology).

The first fastener 106' is circular and is provided with a through hole 61', a recess 64' communicated with the through hole 61', and two screw holes 63'. The through hole 61' is disposed in the center of the first fastener 106', and the recess 64' is disposed on a surface contacting the second cover body 12'. The other surface of the first fastener 106' is provided with a tubular positioning part 62', and a locking block 621' is disposed on the positioning part 62'. The first fastener 106' may be fastened on the second cover body 12' by bolts (not marked).

The color recognition module 100' in the preferred embodiment is assembled by the following steps. The specific steps include:

assembling the optical lens' 103', the color detector 104' and the connector 105' on the PCB 102', and forming an assembly; and assembling the above assembly and fixing the assembly on the second cover body 12'; assembling the first cover body 11' on the second cover body 12'; and assembling the first fastener 106' on the second cover body 12'.

By the above steps, the color recognition module 100' is assembled.

As the color recognition module 100' is provided with a fastener, namely the first fastener 106', the color recognition module 100' can be rapidly mounted on the illuminating device.

A second fastener 107' on the illuminating device provided by the preferred embodiment is circular and is provided with a locking hole 71' for accommodating the positioning part 62' on the first fastener 106', and three stop blocks 72' disposed in the locking hole 71'. Each stop block 72' is provided with a depressed part 721' and ribs 722' and 723' disposed on two sides of the depressed part 721'. The height of the rib 723' is less than the height of the rib 722'.

The positioning part 62' of the second fastener 107' is rotated for a certain angle after being accommodated into the locking hole 71', so that the locking block 621' can be accommodated in the depressed part 721' after passing over the lower rib 723' on the stop block 72'. Due to the limitation of the ribs 722' and 723', the second fastener 107' is stably fixed on the first fastener 106'. The second fastener 107' is mounted on the illuminating device. The through hole 61' and the locking hole 71' allow a connecting line to run through.

The color recognition module 100' and the illuminating device can be rapidly connected by the fastening cooperation of the first fastener 106' and the second fastener 107'.

The control system provided by the embodiments of the present disclosure corrects the initial reflected light of the illuminated object by acquiring the environment color, reduces the interference of the ambient light on the reflected light of the illuminated object, and obtains more precisely corrected color closer to the true color of the illuminated object, so that the illuminating device can select the irradiating light coordinated with the true color of the illuminated object.

In the present disclosure, one objective of the embodiments may be to provide an illuminating device, a control method thereof and a control system thereof, which can precisely acquire the color of an illuminated object and adjust irradiating light emitted by the illuminating device according to the color of the object.

In order to achieve this objective, the present disclosure provides a control method of an illuminating device, which may include:

switching on the illuminating device to project initial detection light to an illuminated object;

acquiring initial reflected light of the illuminated object;

obtaining an initial color of the illuminated object according to the initial reflected light;

switching off the illuminating device projecting the initial detection light to the illuminated object;

acquiring an environment color of an environment provided with the illuminating device;

correcting the initial color according to the environment color to obtain a corrected color;

acquiring target irradiating light according to the corrected color; and controlling the illuminating device to project the target irradiating light to the illuminated object.

Further, the control method may include:

switching on and off the illuminating device to project the detection light to the illuminated object by modulating a pulse width modulation (PWM) signal according to a preset pulse width.

Further, the correcting of the initial color according to the environment color to obtain the corrected color specifically includes:

determining whether the environment color satisfies a preset environment color condition, or not;

obtaining a corrected color which is the same as the initial color when the environment color satisfies the preset condition;

adjusting the color of the initial detection light and obtaining at least one kind of adjusted detection light when the environment color does not satisfy the preset condition;

switching on the illuminating device to project the adjusted detection light to the illuminated object;

acquiring adjusted reflected light of the illuminated object;

comparing the colors between each of the adjusted reflected light and the initial reflected light, and obtaining reflected light color increments; and obtaining the corrected color of the illuminated object according to the adjusted reflected light with maximum reflected light color increment.

Further, the preset environment color condition specifically includes:

the value of the environment color is lower than the default environment color value.

Further, the adjusted detection light at least includes detection light of three primary color RGB.

Further, the comparing of the color between each of the adjusted reflected light and the initial reflected light to obtain the reflected light color increments specifically includes:

obtaining reflected light RGB increments by the difference between the RGB value of each of the adjusted reflected light and the RGB value of the initial reflected light.

Further, the obtaining of the corrected color of the illuminated object according to the adjusted reflected light with the maximum reflected light color increment specifically includes:

acquiring maximum primary color increment in all the reflected light RGB increments; and obtaining the corrected color of the illuminated object according to adjusted reflected light corresponding to the maximum primary color increment.

Further, the initial detection light is white light.

Further, the acquiring of the target irradiating light according to the corrected color specifically includes:

inquiring a target irradiating light list according to the corrected color, and acquiring the target irradiating light.

Further, the acquiring of the target irradiating light according to the corrected color specifically includes:

controlling the illuminating device to project the initial irradiating light to the illuminated object, in which the color of the initial irradiating light is the corrected color;

acquiring the color of reflected light generated by the illuminated object on the basis of the initial irradiating light;

acquiring a target color according to the color of the reflected light generated on the basis of the initial irradiating light;

controlling the illuminating device to project irradiating light to be selected to the illuminated object, in which the color of the irradiating light to be selected is in the target color;

acquiring the color of reflected light generated by the illuminated object on the basis of the irradiating light to be selected; and determining whether a color difference between the reflected light generated on the basis of the initial irradiating light and the reflected light generated on the basis of the irradiating light to be selected is within a preset color difference range, or not, if yes, taking the irradiating light to be selected as the target irradiating light.

In order to achieve the above objective, the present disclosure provides a control system of an illuminating device, which may include:

a detection light switching circuit for switching on the illuminating device to project initial detection light to an illuminated object;

an initial reflected light acquiring circuit for acquiring initial reflected light of the illuminated object;

an initial color operation circuit for obtaining an initial color of the illuminated object according to the initial reflected light;

the detection light switching circuit being used for switching off the illuminating device projecting the initial detection light to the illuminated object;

an environment color acquiring circuit for acquiring an environment color of an environment provided with the illuminating device;

an initial color correcting circuit for correcting the initial color according to the environment color to obtain a corrected color;

a target irradiating light acquiring circuit for acquiring target irradiating light according to the corrected color; and a target irradiating light start circuit for controlling the illuminating device to project the target irradiating light to the illuminated object.

Further, the control system may include:

the detection light switching circuit controls the "On" and "Off" of the illuminating device to project the detection light to the illuminated object by modulating a PWM signal according to the preset pulse width.

Further, the initial color correcting circuit is specifically used for:

determining whether the environment color satisfies the preset environment color condition, or not;

obtaining a corrected color which is the same as the initial color when the environment color satisfies the preset condition;

adjusting the color of the initial detection light to obtain at least one kind of adjusted detection light when the environment color does not satisfy the preset condition;

switching on the illuminating device to project the adjusted detection light to the illuminated object, and acquiring adjusted reflected light of the illuminated object;

comparing the colors between each of the adjusted reflected light and the initial reflected light to obtain reflected light color increments; and obtaining the corrected color of the illuminated object according to adjusted reflected light with maximum reflected light color increment.

Further, the preset environment color condition specifically includes:

the value of the environment color is lower than the preset environment color value.

Further, the adjusted detection light at least includes detection light of RGB three primary colors.

Further, the initial color correcting circuit is specifically used for:

obtaining reflected light RGB increments by the difference between the RGB value of each of the adjusted reflected light and the RGB value of the initial reflected light.

Further, the initial color correcting circuit is specifically used for:

acquiring a maximum primary color increment in all of the reflected light RGB increments; and obtaining the corrected color of the illuminated object according to adjusted reflected light corresponding to the maximum primary color increment.

Further, the initial detection light is white light.

Further, the target irradiating light acquiring circuit is specifically used for:

inquiring a target irradiating light list according to the corrected color, and acquiring the target irradiating light.

Further, the target irradiating light acquiring circuit is specifically used for:

controlling the illuminating device to project the initial irradiating light to the illuminated object, in which the color of the initial irradiating light is the corrected color;

acquiring the color of reflected light generated by the illuminated object on the basis of the initial irradiating light;

acquiring a target color according to the color of the reflected light generated on the basis of the initial irradiating light;

controlling the illuminating device to project irradiating light to be selected to the illuminated object, in which the color of the irradiating light to be selected is in the target color;

acquiring the color of reflected light generated by the illuminated object on the basis of the irradiating light to be selected; and determining whether a color difference between the reflected light generated on the basis of the initial irradiating light and the reflected light generated on the basis of the irradiating light to be selected is within the preset color difference range, if yes, taking the irradiating light to be selected as the target irradiating light.

In order to achieve the above objective, the present disclosure provides an illuminating device, which may include:

a light-emitting source;

a power drive unit for adjusting the power supplied for the light-emitting source; and the control system as the previously described, in which the control system is electrically connected with the light-emitting source and the power drive unit.

Further, it further may include a color recognition circuit, in which the color recognition circuit is integrated onto the illuminating device and used for being cooperated with the initial reflected light acquiring circuit, the environment color acquiring circuit and the target irradiating light acquiring circuit acquiring the color of the reflected light generated by the illuminated object on the basis of the irradiating light and/or the environment color of the environment provided with the illuminating device, and it includes: a housing, a printed circuit board (PCB) accommodated in the housing, and a color detector mounted on one side of the PCB.

Further, the color recognition circuit also includes a connector mounted on the other side of the PCB and connected to the illuminating device; the connector being extended out of the housing and communicated with the outside of the housing.

Further, the color recognition circuit further includes a first fastener mounted on the housing; and the illuminating device includes a second fastener; the first fastener and the second fastener being connected in a locking manner.

Further, the color recognition circuit is disposed adjacent to the light-emitting source and detects the color of the illuminated object towards the illumination direction of the light-emitting source.

Further, the illuminating device has a lamp body; and both the color recognition circuit and the light-emitting source are accommodated in the lamp body.

Further, the illuminating device is self-adapting spotlights and further may include a reflecting shade, a transmitting shade and a lamp body, in which the reflecting shade covers the light-emitting source and is expanded out towards the light-emitting direction of the light-emitting source, and the transmitting shade covers a light outlet of the reflecting shade.

As can be seen from the above description, the present disclosure may correct the initial reflected light of the illuminated object by acquiring the environment color, may reduce the interference of the ambient light on the reflected light of the illuminated object, and thus may obtain more precise corrected color that is closer to the true color of the illuminated object. As such, the illuminating device can select the irradiating light coordinated with the true color of the illuminated object.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The foregoing is only the embodiments of the present disclosure and is not intended to limit the present disclosure. Various changes and variations may be made by an ordinary skill in the art. Any modification, equivalent replacement, improvement, or the like made within the spirit and the principle of the present disclosure shall fall within the scope of the claims of the present disclosure.

What is claimed is:

1. An illuminating device, comprising:
   a light-emitting source;
   a power drive unit for adjusting the power supplied for the light-emitting source;
   a control system that is electrically connected with the light-emitting source and the power drive unit; and
   wherein the control system comprises:

a detection light switching circuit for switching on the illuminating device to project initial detection light to an illuminated object;

an initial reflected light acquiring circuit for acquiring initial reflected light of the illuminated object;

an initial color operation circuit for obtaining an initial color of the illuminated object according to the initial reflected light;

the detection light switching circuit being used for switching off the illuminating device projecting the initial detection light to the illuminated object;

an environment color acquiring circuit for acquiring an environment color of an environment provided with the illuminating device;

an initial color correcting circuit for correcting the initial color according to the environment color to obtain a corrected color, wherein the initial color is set to be the corrected color when the environment color is within a preset color difference range, and the initial color is adjusted to obtain the corrected color according to the environment color when the environment color exceeds the preset color difference range;

a target irradiating light acquiring circuit for acquiring target irradiating light according to the corrected color; and a target irradiating light start circuit for controlling the illuminating device to project the target irradiating light to the illuminated object.

2. The illuminating device according to claim 1, further comprising a color recognition circuit, wherein the color recognition circuit is integrated onto the illuminating device and used for being cooperated with the initial reflected light acquiring circuit, the environment color acquiring circuit and the target irradiating light acquiring circuit acquiring the color of the reflected light generated by the illuminated object on the basis of the irradiating light and/or the environment color of the environment provided with the illuminating device, and it includes: a housing, a printed circuit board (PCB) accommodated in the housing, and a color detector mounted on one side of the PCB.

3. The illuminating device according to claim 2, wherein the color recognition circuit further comprises a connector mounted on the other side of the PCB and connected to the illuminating device; the connector being extended out of the housing and communicated with the outside of the housing.

4. The illuminating device according to claim 2, wherein the color recognition circuit further comprises a first fastener mounted on the housing; and the illuminating device includes a second fastener; the first fastener and the second fastener being connected in a locking manner.

5. The illuminating device according to claim 2, wherein the color recognition circuit is disposed adjacent to the light-emitting source and detects the color of the illuminated object towards the illumination direction of the light-emitting source.

6. The illuminating device according to claim 1, wherein the illuminating device has a lamp body; and both the color recognition circuit and the light-emitting source are accommodated in the lamp body.

7. The illuminating device according to claim 1, wherein the illuminating device is self-adapting spotlights and further comprises a reflecting shade, a transmitting shade and a lamp body, in which the reflecting shade covers the light-emitting source and is expanded out towards the light-emitting direction of the light-emitting source, and the transmitting shade covers a light outlet of the reflecting shade.

8. The illuminating device of claim 1, wherein the control system further comprises:

the detection light switching circuit controls the "On" and "Off" of the illuminating device to project the detection light to the illuminated object by modulating a PWM signal according to the preset pulse width.

9. The illuminating device of claim 1, wherein the initial color correcting circuit of the control system is used for:

determining whether the environment color satisfies the preset environment color condition or not;

obtaining a corrected color which is the same as the initial color when the environment color satisfies the preset condition;

adjusting the color of the initial detection light to obtain an adjusted detection light when the environment color does not satisfy the preset condition;

switching on the illuminating device to project the adjusted detection light to the illuminated object, and acquiring adjusted reflected light of the illuminated object;

comparing the colors between each of the adjusted reflected light and the initial reflected light, and obtaining reflected light color increments; and obtaining the corrected color of the illuminated object according to adjusted reflected light with maximum reflected light color increment.

10. The illuminating device of claim 1, wherein the environment color comprises:

the value of the environment color is lower than a preset environment color value.

11. The illuminating device of claim 1, wherein the initial color correcting circuit is used for:

obtaining reflected light RGB increments by the difference between the RGB value of each of the adjusted reflected light and the RGB value of the initial reflected light.

12. The illuminating device of claim 1, wherein the initial color correcting circuit is used for:

acquiring a maximum primary color increment in all of the reflected light RGB increments; and obtaining the corrected color of the illuminated object according to adjusted reflected light corresponding to the maximum primary color increment.

13. The illuminating device of claim 1, wherein the target irradiating light acquiring circuit is used for:

controlling the illuminating device to project the initial irradiating light to the illuminated object, in which the color of the initial irradiating light is the corrected color;

acquiring the color of reflected light generated by the illuminated object on the basis of the initial irradiating light;

acquiring a target color according to the color of the reflected light generated on the basis of the initial irradiating light;

controlling the illuminating device to project irradiating light to be selected to the illuminated object, in which the color of the irradiating light to be selected is in the target color;

acquiring the color of reflected light generated by the illuminated object on the basis of the irradiating light to be selected; and determining whether a color difference between the reflected light generated on the basis of the initial irradiating light and the reflected light generated on the basis of the irradiating light to be selected is within the preset color difference range.

* * * * *